United States Patent [19]
Bosshard

[11] 3,889,123
[45] June 10, 1975

[54] IRRADIATION PLANT FOR FLOWABLE MATERIAL

[75] Inventor: Ernst Bosshard, Winterthur, Switzerland

[73] Assignee: Sulzer Brothers Ltd., Winterthur, Switzerland

[22] Filed: Feb. 15, 1973

[21] Appl. No.: 332,707

[30] Foreign Application Priority Data
Feb. 16, 1972  Switzerland.......................... 2234/72

[52] U.S. Cl. .................. 250/437; 250/432; 250/436
[51] Int. Cl. ............................................ G01n 21/26
[58] Field of Search ........... 250/432, 436, 437, 438, 250/455, 506, 507

[56] References Cited
UNITED STATES PATENTS

| | | |
|---|---|---|
| 3,102,958 | 9/1963 | King................................ 250/506 X |
| 3,527,940 | 9/1970 | Balanca et al. ................. 250/437 X |
| 3,602,712 | 8/1971 | Mann.................................. 250/436 |
| 3,638,023 | 1/1972 | Cottam et al........................ 250/437 |
| 3,671,741 | 6/1972 | Woodbridge et al. .......... 250/437 X |
| 3,767,918 | 10/1973 | Graybeal......................... 250/437 X |

*Primary Examiner*—Archie R. Borchelt
*Attorney, Agent, or Firm*—Kenyon & Kenyon Reilly Carr & Chapin

[57] ABSTRACT

The irradiation plant can be used to treat various flowable materials including effluent or sewage sludge. The plant contains a concrete vessel in which a partition is mounted to form two coaxial irradiation chambers through which the flowable material can be circulated by means of an impeller. The partition can be formed to house tubes of radiation sources and to provide a venturi-like member about the impeller. The operation of the impeller is reversed periodically to assure movement of both heavy and light particles in the flow.

18 Claims, 3 Drawing Figures

PATENTED JUN 10 1975　　　　　　　　　　3,889,123

SHEET　　2

IRRADIATION PLANT FOR FLOWABLE MATERIAL

This invention relates to an irradiation plant for flowable material and particularly to an irradiation plant for sewage sludge.

The term "flowable material" is intended to cover liquids and gases and also powder, which may be fluidized by introducing a gas. An example of the flowable material which may be irradiated is effluent or sewage sludge.

Briefly, the invention is directed to an irradiation plant which is constructed to treat flowable materials in a batch manner. As is known, the batch type of treatment of flowable materials such as sewage sludge allows large flow-cross sections and large flow velocities to be obtained. In addition, as opposed to known continuous treatment systems which require baffles in the flow path to obtain turbulence of flow while ensuring proper exposure to radiation, the batch type of treatment need not require baffles and so, the treatment can be more effectively carried out as there would be no baffles to absorb radiation energy.

Accordingly, it is an object of the invention to provide a simple technique for batch treating flowable materials with radiation.

It is another object of the invention to provide an irradiation plant in which flowable material can be repeatedly circulated about a radiation source while ensuring that heavy and light particles in the flow are subjected to uniform radiation doses.

It is another object of the invention to provide a simple means for replenishing radiation sources in an irradiation plant of the batch type.

It is another object of the invention to provide for uniform radiation dosage of a flowable material in a batch treatment.

The invention provides an irradiation plant of the batch type comprising a vessel having a wall defining a surface of revolution about a vertical axis and enclosing an irradiation chamber, a partition within the irradiation chamber defining a coaxial surface of revolution with the wall and which divides the irradiation chamber into two coaxial zones, and a circulating means in the chamber for circulating the flowable material successively through the two zones in a sequence of opposite flow directions.

Since the irradiation chamber which receives the material to be irradiated is defined by a wall formed by a surface of revolution and contains a partition formed by a coaxial surface of revolution, the mass of the walls situated in the irradiation chamber is very small and only an extremely small amount of radiation is adsorbed by these walls. Another advantage of the small wall surface area is that circulation consumes very little power. In addition, the outlay on materials for the plant is small, so that the plant is cheap to build.

In a preferred construction, the circulating means is inside the zone defined by the partition, preferably near one end of the partition. This gives a particularly satisfactory stirring action, since secondary flows emanating from the outer edge of the circulator are avoided. This effect is further assisted if the zone inside the partition is constricted in the vicinity of the circulating means. This has the further advantage of allowing a corresponding reduction in the diameter of the circulating means so that the speed of rotation of the circulating means can be increased. Moreover, a circulating means with a smaller diameter can be installed and removed through an opening of correspondingly reduced size.

The circulating means may be provided with a drive whose direction of rotation can be reversed. Such a drive enables the direction of circulation in the irradiation chamber to be reversed. Thus, particles of higher or lower specific gravity, if present in the material to be irradiated, are drawn into the zone inside the partition and flowed past the radiation source, i.e., they do not settle or rise to the surface.

In the case of a very small capacity plant, the radiation source is preferably situated on the vertical central axis of the irradiation chamber. However, in larger-capacity plants cavities can be provided in the partition, each cavity being parallel to the axis of the partition and containing one radiation source. This has the advantage that the partition fulfills two functions, that is, subdividing the irradiation chamber and providing a mounting for the radiation sources. Such a partition also assists in reducing the radiation absorption, lowers the flow resistance and elminates a surface on which the material to be irradiated might settle.

These and other objects and advantages of the invention will become more apparent from the following detailed description and appended claims taken in conjunction with the accompanying drawings in which:

Figure 1:
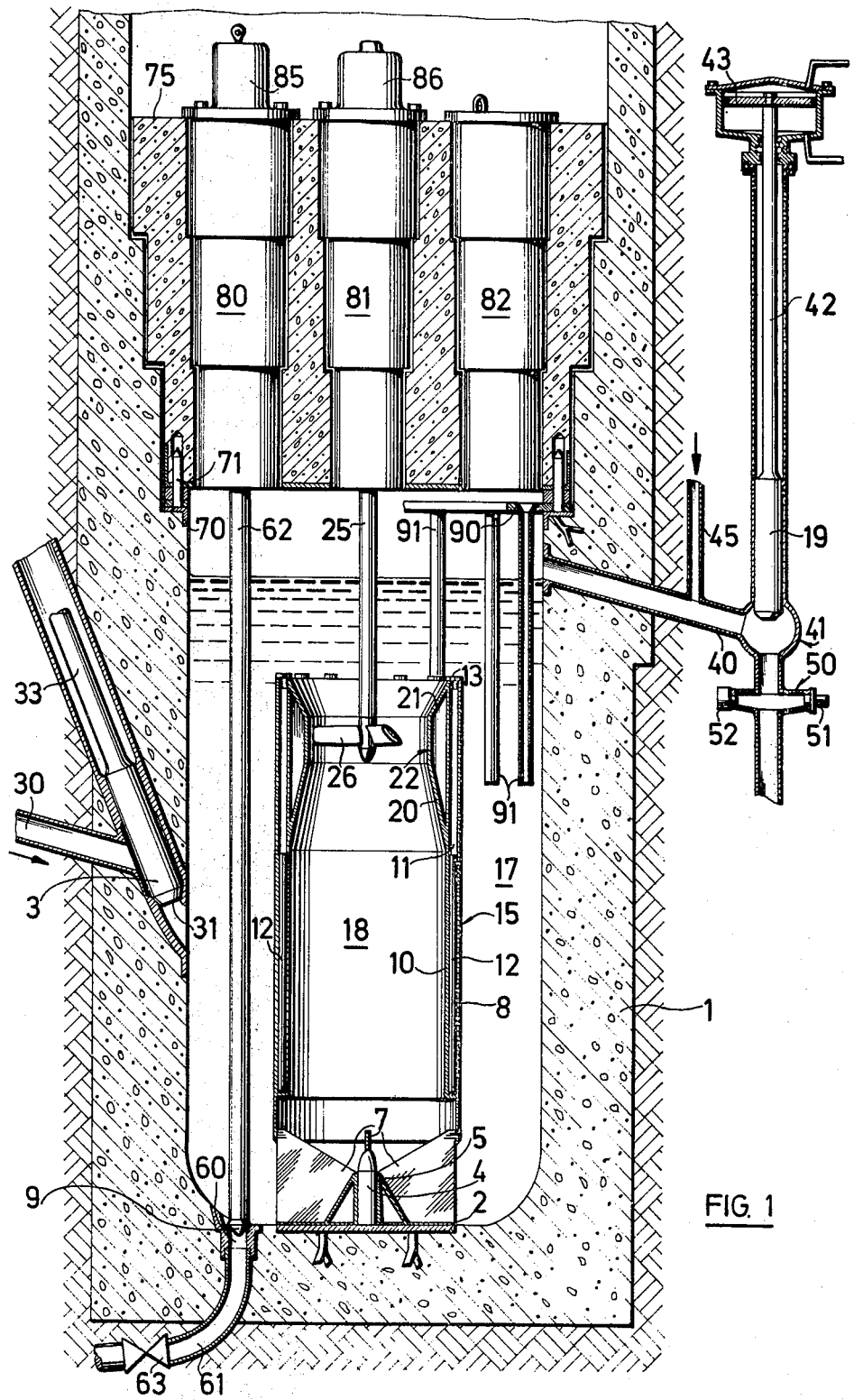
FIG. 1 illustrates a vertical sectional view through an irradiation plant according to the invention.

Referring to FIG. 1, the irradiation plant has a concrete vessel 1 which can be closed with a cover 75 and has a wall which defines an irradiation chamber with a circular-cylindrical cross-section about a vertical axis. The vessel 1 houses a coaxial circular-cylindrical partition 15 which is supported at the lower end by radial fins 7 on a slab 2 cast into the bottom of the concrete vessel 1. The slab 2 carries a stem 4 which forms a flow guide into the partition 15 along with a hollow cone 5 to which the fins 7 are attached.

The partition 15 consists of two coaxial tubes 8, 10 which are interconnected by radial webs 11 distributed around the circumference of the partition 15. Each of, some, or all of the gaps or cavities formed between the webs 11 receives a rod-like radiation source 12. Those gaps containing radiation sources 12 are closed with plugs 13 at the top and extend longitudinally of the partition 15. Otherwise, the tubes 8, 10 are joined together in a fluid-tight manner at their top and bottom ends. The partition 15 divides the chamber defined by the concrete vessel 1 into two coaxial irradiation zones 17, 18, zone 17 being annular. The partition 15, as shown, is of shorter length than the vessel wall and is disposed intermediately of the length of the wall to define flow passages interconnecting the coaxial zones 17, 18 for recirculation of a flowable material through the zones.

A circulating means in the form of a three-blade impeller 26 is mounted in the upper part of the zone 18 inside the partition 15 for circulating the material to be irradiated. As shown, the partition 15 forms a construction within the interior zone 18 in the vicinity of the impeller 26. The constriction is defined by means of a venturi-like tubular member 22 having two conical portions 20, 21 between which a cylindrical portion is disposed. The venturi-like member 22 is rigidly connected to the inner tube 10 of the partition 15. The impeller 26 is mounted on a shaft 25 which extends upwards through the cover 75.

A supply pipe 30 for supplying the material to be irradiated is provided in the side of the concrete vessel 1 and has a valve 31 which a bevelled seat near where the pipe 30 opens into the outer irradiation zone 17. The valve 31 has a closure member 3 which is operated by a servomotor (not shown) by way of a rod 33 in a suitable manner to close the pipe 30.

A discharge valve 60 is disposed in the bottom of the concrete vessel 1 for discharging the material after irradiation has been carried out. This valve 60 has a closure member 9 attached to a rod 62 which extends through the irradiation zone 17 and cover 75 for closing the valve 60. The valve 60 is connected by a line 61 to a reservoir (not shown) for irradiated material. The line 61 contains a valve 63 whose function will be described below.

An overflow pipe 40 is provided diametrically opposite the supply pipe 30, between the upper end of the partition 15 and the underside of the cover 75. The overflow pipe 40 contains a valve 41 and leads to the reservoir (not shown) for material awaiting irradiation. The valve 41 has a closure member 19 which is operated via a rod 42 by a hydraulic servomotor 43. In addition, a monitoring device 50 is disposed downwstream of the valve 41. This monitoring device 50 comprises a light source 51 and a photo-electric cell 52 and is connected by leads (not shown) to an electronic device (not shown) for controlling the servomotor which operates the closure member 3 of the valve 31 in the supply pipe 30. In addition, a flushing pipe 45 is connected to the overflow pipe 40 upstream of the valve 41.

The cover 75 consists principally of concrete and is reduced downwards by means of steps. The internal diameter of the concrete vessel 1 reduces in corresponding steps. A ring 70 with an angle-shaped cross-section is provided on the bottom step of the concrete vessel 1 to protect the edge of the step. The ring 70 is provided with vertical pins 71 spaced round the circumference of the ring 70 which extend into corresponding holes in the cover 75 when the vessel 1 is closed. The cover 75 is provided with three stepped shield inserts 80, 81, 82, which can be pulled out of cover 75 upwards. One shield insert 80 contains a bore for the rod 62 of the discharge valve 60, the upper end of this rod 62 being connected to a servomotor 85 flanged onto the insert 80. Another shield insert 81 contains a bore for the shaft 25 of the impeller 26, the upper end of the shaft 25 being connected to a reversible drive such as an electric motor 86 flanged onto the insert 81. The third shield insert 82 acts as a reserve.

A ring 90 as indicated in the right-hand half of the irradiation chamber as viewed between the overflow pipe 40 and the underside of the cover 75, is provided with tubes 91 which extend downwards into the zone 17 and are closed at the bottom. The tubes 91 may be distributed around the entire circumference of the ring 90. This arrangement serves as a magazine for the rod-like radiation sources 12 and is absent from the irradiation chamber during normal operation of the irradiation plant. The function of the magazine will be described in detail below.

The plant described operates as follows.

The material to be irradiated, e.g. sewage sludge, flows along the supply pipe 30 into the irradiation chamber (the valve 31 being open and the discharge valve 60 closed) and fills the chamber up to the entrance to the overflow pipe 40, whose valve 41 is also open. The liquid running down the overflow pipe 40 causes the monitoring device 50 to respond and to cause the closure member 3 of the valve 31 to close. The motor 86 is then switched on so that the impeller 26 circulates the material to be irradiated round the irradiation chamber in such a way that the material flows down the chamber zone 18, changes direction at the bottom of the vessel 1, and flows up the annular chamber zone 17. On reaching the upper end of the irradiation chamber zone 17, the flow streams towards the impeller 26 and back into the chamber zone 18, where the flow flows down again. This circular flow is continued until the material has received the prescribed radiation dose.

The material to be irradiated may contain particles which have a higher specific gravity than the liquid containing them. In such a case, with the circular flow described, the heavier particles might stay in a zone of low radiation intensity at the bottom of the irradiation chamber. To prevent this, the direction or rotation of the motor 86 is reversed, so that the circular flow described above is also reversed. The liquid now draws the heavier particles at the bottom of the irradiation chamber into the center where the flow is much stronger, so that the particles are now carried up the chamber zone 18. Since the fluid may contain, in addition to the heavier particles, particles of lower specific gravity which, in the case of the circular flow last described, float on the fluid at the periphery of the upper end of the irradiation chamber, remaining there in a zone of low radiation intensity, the reversing of the motor 86 takes place periodically during the irradiation time. As a result, adequate irradiation of the heavier and lighter particles is effected.

On completion of irradiation, the rod 62 of the discharge valve 60 is raised by means of the servomotor 85 so that the irradiated material flows out along the pipe 61 and through the open valve 63 into the reservoir (not shown). The discharge valve 60 is then closed and the valve 31 in the supply pipe 30 is opened in a suitable manner so that the next batch of material for irradiation can flow into the irradiation chamber.

If the rod-like radiation sources 12 require changing, the overflow valve 41 is closed after the irradiated material has been discharged through the pipe 61. Next, the irradiation chamber is flushed out with water supplied along the flushing line 45. The valve 63 in the discharge pipe 61 is then closed and the concrete vessel 1 is filled with water to a level above the cover 75. This water also can be supplied along the flushing pipe 45. In order to allow the air to escape and the water to rise above the cover 75, the shield insert 82 contains a conventional labyrinth passage which passes water but not radiation, and whose walls, for example, are made of lead. When the vessel 1 is full, the shield inserts 80, 81 and possibly 82 are removed under water and then the cover 75 is lifted off. An empty magazine 90, 91 is now introduced into the vessel 1 and after removal of the plugs 13 by means of hand manipulators, the rod-like radiation sources 12 are extracted from the partition 15 and inserted into the tubes 91. The partition 15, together with the radial fins 7 and hollow cone 5, is now removed from the vessel 1. The irradiation chamber in the vessel 1 now offers enough room for a transport flask containing fresh radiation sources to be brought into the veseel. The spent radiation sources in the tubes 91 are exchanged for the fresh radiation sources in the transport flask, and this flask, with the spent sources, is removed from the vessel 1. The partition 15, which has meanwhile been checked, is then put back in the vessel 1 and the fresh radiation sources are transferred from the tubes 91 into the partition 15. The plugs 13 are put back and the magazine 90, 91 is taken out of the vessel. The vessel 1 is closed again by means of the cover 75, the inserts 80, 81, 82 are put back in their shielding positions, and the water is drained off through the pipe 61 by opening valve 63. The irradiation plant is now operational again.

Figure 2:
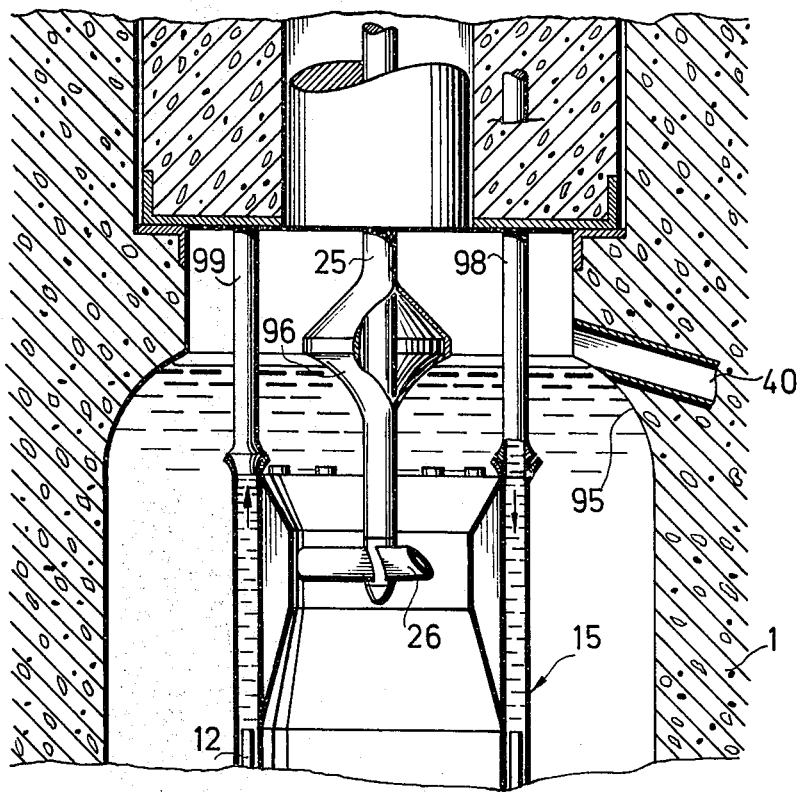
FIG. 2 illustrates a vertical sectional view through part of a modified irradiation plant according to the invention.

Referring to FIG. 2, wherein like reference characters indicate like parts as above, the wall defining the outside of the irradiation chamber forms a part-toroidal surface 95 near the surface of the material being irradiated, i.e., above the level of the partition 15, as shown, and a body of revolution 96 which flares upwards in the form of a trumpet is attached to the shaft 25 of the impeller 26 near the surface of the material, again, above the level of the partition 15. These two features prevent secondary vortices from being created in the vicinity of the liquid surface.

In the plant shown in FIG. 2, a pipe 98 is also connected to the partition 15 to supply coolant to the gaps or cavities inside the partition 15.

Figure 3:
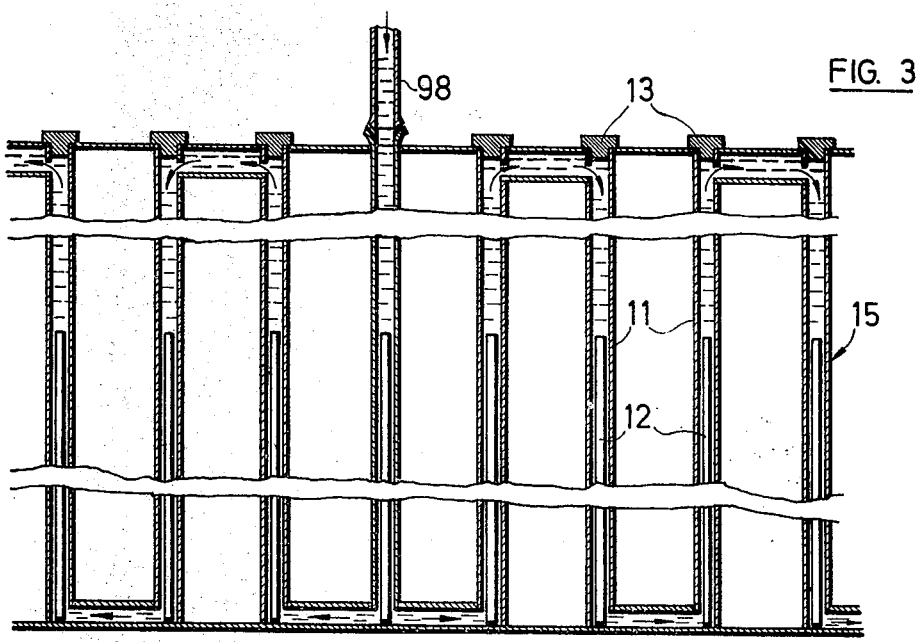
FIG. 3 illustrates a vertical sectional view through a developed portion of the partition of the plant shown in FIG. 2.

Referring to FIG. 3, the cavities are arranged in two parallel groups as regards the coolant, the cavities within each group being connected in series with one another. After flowing through the cavities, the coolant is discharged through a pipe 99 (FIG. 2) connected to the partition 15 diametrically opposite the pipe 98. The separate coolant supply for the partition 15 allows the use of high irradiation energies. A further advantage is that the pressure in the cavities containing the sources 12 can be kept higher than that in the irradiation chamber, so that the material to be irradiated does not penetrate into the partition 15 in the event of a leak in the partition 15.

The positioning of the impeller 26 near the upper end of the partition 15, as illustrated, has the advantage that the impeller 26 remains outside the zone of high radiation intensity. This helps to keep down losses due to the adsorption of radiation.

The rod-shaped radiation sources 12 may consist of Co 60. Spent reactor fuel, possibly encapsulated in glass, may also be used as a radiation source.

Instead of providing a plurality of radiation sources in the partition 15 as described, a single radiation source may be provided, preferably at the center of the irradiation chamber zone 18. This arrangement is suitable for plants with low irradiation outputs.

What is claimed is:

1. An irradiation plant for the batch treatment of flowable material comprising
    a vessel having a wall defining a surface of revolution about a vertical axis and enclosing an irradiation chamber;
    a partition within said chamber defining a coaxial surface of revolution with said wall and dividing said irradiation chamber into two coaxial zones; and
    a circulating means in said irradiation chamber for circulating the flowable material successively through said two coaxial zones and in a sequence of opposite flow directions.

2. An irradiation plant as set forth in claim 1 wherein said circulating means includes an impeller mounted within said partition for reversible rotation.

3. An irradiation plant as set forth in claim 1 wherein said surface of revolution of said wall is circular-cylindrical over the height of said partition.

4. An irradiation plant as set forth in claim 2 wherein said wall narrows continuously above said partition in a direction away from said partition.

5. An irradiation plant as set forth in claim 4 wherein said wall forms a part-toroidal surface above said partition.

6. An irradiation plant as set forth in claim 1 wherein said partition defines a circular-cylindrical surface of revolution.

7. An irradiation plant as set forth in claim 1 wherein said circulating means is disposed within said partition.

8. An irradiation plant as set forth in claim 7 wherein said partition forms a constriction about said circulating means.

9. An irradiation plant as set forth in claim 7 wherein said circulating means includes at least two impeller blades within said chamber for inducing a flow of the flowable material.

10. An irradiation plant as set forth in claim 1 wherein said circulating means includes a reversible drive.

11. An irradiation plant as set forth in claim 1 further comprising a body of revolution having an upwardly flaring trumpet-shaped disposed above and in coaxial relation to said partition in the vicinity of the normal surface level of the material flowing through said chamber.

12. An irradiation plant as set forth in claim 11 wherein said wall forms a part-toroidal surface above said partition and in coaxial coplanar relation with said body of revolution.

13. An irradiation plant as set forth in claim 1 wherein said partition includes a plurality of elongated radiation source receiving cavities extending parallel to the longitudinal axis of said partition.

14. An irradiation plant as set forth in claim 13 wherein said cavities are interconnected to each other for passage of a flow of coolant therethrough and which further includes means for connecting said cavities to a coolant source.

15. An irradiation plant as set forth in claim 14 wherein said cavities are arranged in at least one group, with the cavities in each group being connected in series.

16. An irradiation plant as set forth in claim 1 further comprising an annular radiation source magazine removably mounted between said wall and said partition.

17. An irradiation plant as set forth in claim 1 wherein said partition is of shorter length than said vessel wall and is disposed intermediately of the length of said wall to define flow passages interconnecting said two coaxial zones for recirculation of the flowable material through said zones.

18. An irradiation plant for the batch treatment of sewage sludge comprising a concrete vessel having an irradiation chamber with a circular-cylindrical cross-section about a vertical axis and a cover closing said chamber;

a coaxial partition within said chamber dividing said chamber into two coaxial radiation zones, said partition including two coaxial tubes and a plurality of radial webs interconnecting said tubes and defining cavities therebetween;

plugs at the top of each of said cavities for closing said cavities;

an impeller mounted on an upper part of one of said radiation zones inside said partition for recirculating the sludge to be irradiated through said zones;

a constriction within said one zone in the vicinity of said impeller;

a supply pipe for supplying sludge to be irradiated in a side of said vessel;

a valve in said supply pipe having a closure member to close said pipe; and a discharge valve in the bottom of said vessel for discharging sludge after irradiation, said discharge valve having a closure member for closing said discharge valve.

* * * * *